(12) United States Patent
Al-Mayah

(10) Patent No.: US 11,326,347 B2
(45) Date of Patent: May 10, 2022

(54) ANCHOR SYSTEM FOR FIBER REINFORCED POLYMERS

(71) Applicant: Adil Al-Mayah, Waterloo (CA)

(72) Inventor: Adil Al-Mayah, Waterloo (CA)

( * ) Notice: Subject to any disclaimer, the term of this patent is extended or adjusted under 35 U.S.C. 154(b) by 83 days.

(21) Appl. No.: 16/402,785

(22) Filed: May 3, 2019

(65) Prior Publication Data
US 2019/0257087 A1 Aug. 22, 2019

Related U.S. Application Data

(63) Continuation of application No. PCT/CA2017/051294, filed on Nov. 1, 2017.

(60) Provisional application No. 62/417,560, filed on Nov. 4, 2016.

(51) Int. Cl.
| | |
|---|---|
| *E04C 5/08* | (2006.01) |
| *E04C 5/12* | (2006.01) |
| *F16B 2/14* | (2006.01) |
| *F16G 11/04* | (2006.01) |

(52) U.S. Cl.
CPC .............. *E04C 5/122* (2013.01); *E04C 5/085* (2013.01); *E04C 5/127* (2013.01); *F16B 2/14* (2013.01); *F16G 11/04* (2013.01)

(58) Field of Classification Search
CPC .......... E04C 5/122; E04C 5/127; E04C 5/085; F16B 2/14; F16G 11/04
USPC ...................................................... 52/223.13
See application file for complete search history.

(56) References Cited

U.S. PATENT DOCUMENTS

| | | | | |
|---|---|---|---|---|
| 1,153,621 A | * | 9/1915 | Hutchings | ............... F16D 1/094 403/369 |
| 3,698,749 A | * | 10/1972 | Yonkers | ................. H01B 17/40 403/197 |
| 6,082,063 A | * | 7/2000 | Shrive | ..................... E04C 5/122 52/223.13 |
| 7,818,849 B2 | * | 10/2010 | Campbell | ............. F16G 11/042 24/129 R |

(Continued)

FOREIGN PATENT DOCUMENTS

| | | | |
|---|---|---|---|
| CN | 202519884 U | * | 11/2012 |
| CN | 103174261 A | * | 6/2013 |

(Continued)

OTHER PUBLICATIONS

PCT/ISA/210 and PCT/ISA/237 for PCT/CA2017/051294 dated Jan. 2018. (Year: 2018).*

(Continued)

*Primary Examiner* — Robert Canfield
(74) *Attorney, Agent, or Firm* — Gowling WLG (Canada) LLP

(57) ABSTRACT

An anchor system for fiber reinforced polymer (FRP) material having an outer casing including a linear inner profile portion; and a non-linear inner profile portion, both on an inner surface of the outer casing. The anchor further having a wedge configured to be housed by the inner profile of the outer casing, the wedge including: a linear outer profile portion configured to mate with the linear inner profile portion of the outer casing; a non-linear outer profile portion configured to mate with the non-linear inner portion of the outer casing, both on the outer surface of the wedge; and an inner gap formed in the wedge and configured to receive the FRP material.

20 Claims, 10 Drawing Sheets

Barrel with a combination of circular and linear longitudinal profiles

Wedge with a combination of circular and linear longitudinal profiles

(56) References Cited

U.S. PATENT DOCUMENTS

2007/0007405 A1\* 1/2007 Al-Mayah .............. E04C 5/085
248/200

FOREIGN PATENT DOCUMENTS

| CN | 103758289 A | \* | 4/2014 | | |
|---|---|---|---|---|---|
| CN | 106013139 A | \* | 10/2016 | | |
| DE | 3438355 A1 | \* | 4/1986 | ............ | E04C 5/122 |
| DE | 3536926 A1 | \* | 4/1987 | ............ | E04C 5/122 |
| DE | 10010564 C1 | \* | 7/2001 | ............ | E04C 5/122 |
| DE | 102004044386 A1 | \* | 3/2006 | ............ | E04C 5/127 |
| FR | 2628777 A1 | \* | 9/1989 | ............ | E04C 5/122 |
| GB | 686094 A | \* | 1/1953 | ............ | E04C 5/122 |
| GB | 1152434 A | \* | 5/1969 | ............ | E04C 5/122 |
| WO | WO-2005033433 A1 | \* | 4/2005 | ............ | E04C 5/127 |
| WO | WO-2020002111 A1 | \* | 1/2020 | ............ | F16G 11/042 |

OTHER PUBLICATIONS 9 page PDF of machine translation of DE 10010564 C1, Jul. 2001. (Year: 2001).\*

\* cited by examiner

Barrel with a combination of circular and linear longitudinal profiles

Wedge with a combination of circular and linear longitudinal profiles

Circular and straight with slight slope wedges combination

Combination of linear and circular profile with straight wedges

Curved and straight wedge combination

Combination of linear and circular profile with straight wedges

ANCHOR SYSTEM FOR FIBER REINFORCED POLYMERS

RELATED APPLICATIONS

This application is a continuation of PCT/CA2017/051294 filed Nov. 1, 2017 which claims priority to U.S. Provisional Patent Application No. 62/417,560 filed Nov. 4, 2016, which are hereby incorporated by reference.

FIELD

The present disclosure relates generally to anchor systems for fiber reinforced materials. More particularly, the present disclosure relates to an anchor system for anchoring fiber reinforced materials to a base object such as concrete, steel, and timber.

BACKGROUND

Fiber reinforced material and, in particular, fiber-reinforced-polymers (FRP), have been introduced for the structural rehabilitation and retrofitting of aging infrastructure, in addition to its increasing applications in new structural design. This is due to the high tensile strength, non-corroding property, good chemical stability in hostile environment and light weight of FRP. A number of FRP materials have been developed using various types of fibres. These include carbon FRP (CFRP), glass FRP (GFRP), aramid FRP (AFRP) and basalt FRP (BFRP). The CFRP material generally has a higher tensile strength, a higher modulus of elasticity, a longer fatigue life and better creep properties than the other FRP materials. However, the cost of the CFRP may also be the highest of the FRP materials.

Fiber-reinforced materials and, in particular, CFRP material, tends to be preferred for structural rehabilitation. FRP plates or the like can be used in concrete, steel, timber, and masonry structures. However, FRP materials can be more difficult to anchor to the base material because of low transverse compressive strength, which can lead to breakage at or near the anchor point. Further, anchors for FRP materials, and in particular, FRP plate, tend to be very large, expensive, and difficult to manufacture and install.

Finding a suitable anchor system for FRP materials is a challenge as FRP materials are generally sensitive to lateral stress. Conventional FRP anchors can be divided into two major categories: epoxy-based anchors and mechanical anchors (for example, friction-based). Anchor systems include split wedges, clamps, metal overlay, plug and cone, resin sleeve, potted resin and expansive cement. Often the anchor systems are limited by the requirement of precise clamping forces, laborious installation work, large anchor size, long curing time (for epoxy anchoring systems) and low load carrying capacity.

It is, therefore, desirable to provide an improved anchoring system for fiber reinforced materials.

The above information is presented as background information only to assist with an understanding of the present disclosure. No determination has been made, and no assertion is made, as to whether any of the above might be applicable as prior art with regard to the present disclosure.

SUMMARY

In one aspect there is provided an anchor system for fiber reinforced polymer (FRP) material having an outer casing including a linear inner profile portion; and a non-linear inner profile portion, both on an inner surface of the outer casing. The anchor system further having a wedge configured to be housed by the outer casing and, in particular, to be in contact with the inner surface of the outer casing, the wedge including: a linear outer profile portion configured to mate with the linear inner profile portion of the outer casing; a non-linear outer profile portion configured to mate with the non-linear inner portion of the outer casing, both on the outer surface of the wedge; and an inner gap formed in the wedge and configured to receive the FRP material.

In a particular case, the anchor system further includes a sleeve provided between the wedge and the FRP in the inner gap. In some cases, the sleeve is made from a malleable metal.

In another particular case, the wedge comprises two symmetric pieces.

In yet another particular case, the linear profile portion of the outer casing is approximately 60% of the height of the outer casing.

In still yet another particular case, the outer casing comprises two pieces. In some cases, the anchor system has fasteners configured to fasten the two pieces of the outer casing.

In a particular case, the two pieces of the outer casing are symmetric.

In another particular case, the two pieces of the outer casing are asymmetric.

In yet another particular case, the wedge includes two pieces, a first piece having: the linear outer profile portion and the non-linear outer profile portion; and a second piece having a linear profile arranged at a predetermined angle with respect to the height of the wedge.

In still yet another particular case, the wedge includes two pieces, a first piece having the linear outer profile portion; and the non-linear outer profile portion; and a second piece having a linear profile along the height of the wedge.

In a particular case, the inner gap has a rectangular or flat cross-section.

In another particular case, inner gap has a multi-faceted cross-section.

In still yet another particular case, the inner gap has a circular or rounded cross-section.

In another aspect, there is provided a method for anchoring fiber reinforced polymer (FRP) material, the method including: placing a wedge in an outer casing such that an outer surface of the wedge abuts an inner surface of the outer casing via linear and non-linear outer profile portions of the wedge configured to mate with linear and non-linear inner profile portions of the outer casing; and compressing a distal end of the FRP material in the wedge such that the pressure profile of the wedge has a linear portion at the distal end of the FRP material and a non-linear portion adjacent to the linear portion. In particular, the linear and non-linear outer profile portions are configured to distribute gripping stress across the wedge and outer casing.

In still another aspect of the disclosure, there is provided a wedge for an anchor system, the wedge having: an outer surface to engage with a support structure, wherein the outer surface comprises: a linear outer profile portion configured to mate with a linear inner profile portion of the support structure; and a non-linear outer profile portion configured to mate with a non-linear inner portion of the support structure; and an inner gap formed in the wedge and configured to receive an FRP material.

In a particular cases, the inner gap has a rectangular or flat cross-section.

In another particular case, inner gap has a multi-faceted cross-section.

In still another particular case, the inner gap has a circular or rounded cross-section.

BRIEF DESCRIPTION OF FIGURES

Various aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

DETAILED DESCRIPTION

As an initial point, it is noted that FRP materials can come in various shapes and sizes, including those having cross-sections that are rectangular (including strips or sheets), circular or rounded, polygonal or various shapes in between. In some cases several terms are used to describe these shapes. For example, various terms have been used in the literature to describe FRP plates. These terms include 'FRP plate', 'FRP strip', and 'FRP laminate', but these all generally refer to an FRP material formed to have a rectangular cross section in the transverse direction and a longer profile in the longitudinal direction. In some cases, the material may be a strip or sheet made of FRP material. Several terms in the literature have also been used to describe the prestressing anchor for FRP plates including 'anchor', 'anchorage', 'grip', and 'prestressing system'. In this document, the terms "FRP plate" and "anchor" are used to cover these various terms. It is also noted that some embodiments of the anchor system described herein are intended to receive FRP material having various other cross-sections in addition to the rectangular cross-section of the FRP plate, for example, a circular or rounded cross-section, a multi-sided cross-section (for example, octagonal, hexagonal, and the like), a twisted strand, or the like.

As noted above, one particular type of FRP plate is CFRP plate, which may be referred to herein as an example material. CFRP is an orthotropic material. Presently, available CFRP plates for use in new and retrofitted structures tend to have widths up to 180 mm with thicknesses up to 3.0 mm. The ultimate tensile strength of the CFRP plate tends to vary between 1350 MPa and 3200 MPa; and the modulus of elasticity ranges between approximately 165,000 MPa and 300,000 MPa.

As noted above, one of the main challenges in application of FRP plates is the attachment of the FRP plate to the structure. Without adequate anchoring, the FRP plate may detach from the structure. An anchor system may also be used to prestress the FRP plate. Prestressing may reduce deflection and cracking (delayed cracks and less crack width), resulting in a more effective stress redistribution; thus delaying the failure of concrete beams reinforced with FRP plates. In addition, prestressing the FRP plates may enhance the fatigue resistance of the concrete beams and slabs.

Figure 1:
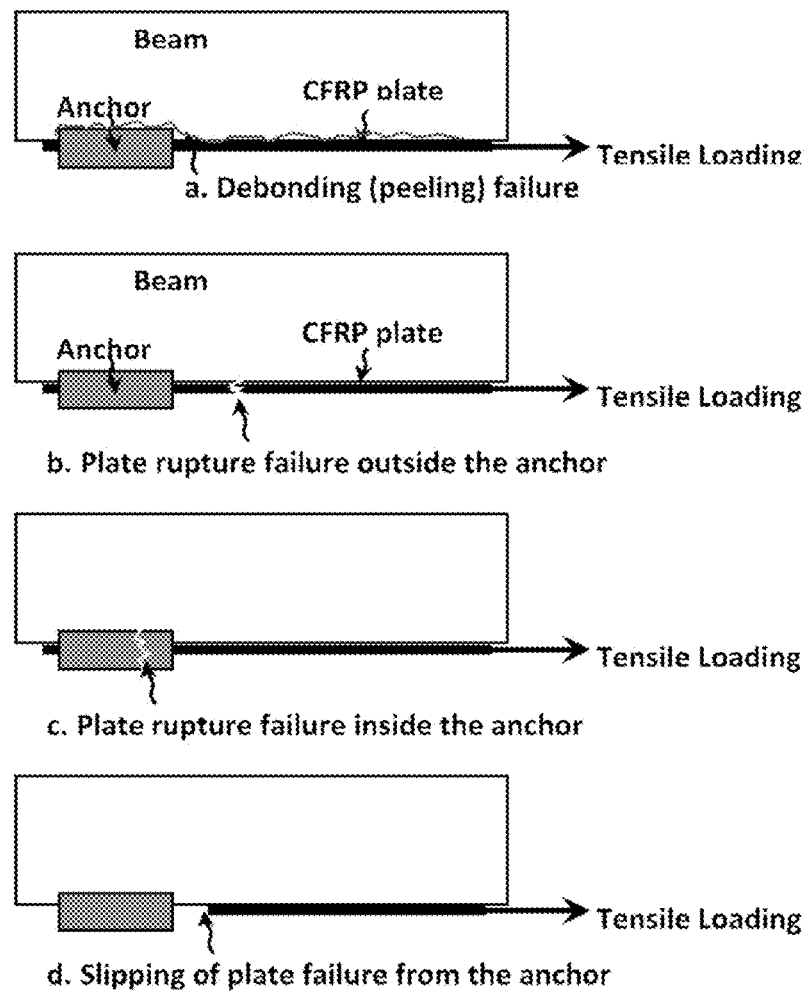
FIG. 1 illustrates potential failure modes of conventional FRP anchors.

Several failure modes of FRP materials and their anchors installed on or in reinforced concrete beams have been reported and are illustrated in FIG. 1. The most common failure modes of these anchors under prestressing tensile load are:
1. Debonding at the concrete-epoxy interface (a). The FRP plate detaches from the beam due to shear stress at the surface exceeding shear strength of the concrete-epoxy interface.
2. Debonding at the FRP plate-epoxy interface. Shear stress at the surface exceeds the shear strength of the CFRP-epoxy interface.
3. Concrete cover separation failure: the anchor and the FRP plate are forced out of the beam along with the concrete clear cover under the steel rebar.
4. Tensile rupture of the FRP plate outside the anchor (b). This is the most acceptable failure mode, since the tensile capacity of the CFRP plate is reached; and the CFRP plate ruptures, not the anchor.
5. Local crushing of the FRP plate inside the anchor due to stress concentration.
6. Slippage of the FRP plate from the anchor (c). The FRP plate slips out of the anchor and leads to the complete loss of the prestressing force.
7. Cracking or crushing of the anchor under loading (d).
8. Fatigue failure of the anchor under cyclic or repeated loads.

An improved anchoring system will generally provide a benefit in reducing or preventing the chances of one or more of these failure modes from occurring. While some of these failure modes can be solved by providing a larger, heavier anchor, it will be understood that it is also important to keep the improved anchoring system compact and relatively lightweight, particularly for larger widths of FRP plate, which have higher loading capability and therefore would typically require a much larger/stronger anchor if using conventional anchoring systems.

In the embodiments described herein, generally speaking, there is provided a compact anchor system, which includes an outer casing that supports a wedge to hold the FRP plate. The wedge may be at least one piece. The anchor system is configured to anchor an FRP plate, for example, a carbon fiber reinforced polymer (CFRP) plate, with regard to a concrete structure. The profile of the outer surface of the at least one wedge and the inner surface of the outer casing are configured to change in the longitudinal direction in a non-linear manner which is intended to anchor the FRP plate and also reduce or eliminate stress concentration on particular areas of the FRP plate. Reducing the stress concentration on the FRP plate is intended to enable the full tensile capacity of the FRP plate to be achieved.

Since the anchor system uses wedges it can be considered a mechanical anchor system using a frictional based gripping mechanism. As such, the anchor system does not require curing as in the case of conventional epoxy based systems. Further, since the frictional forces applied in a mechanical system tend to be higher than those provided by bonding epoxy, the size/length of the anchor system is intended to be reduced. However, since higher gripping forces have been shown to result in premature failure due to the plate's sensitivity to notching in the lateral direction, the non-linear profile of the wedge/outer casing interface is intended to enable the distribution of the stresses, which is intended to provide low gripping stress at the end of the FRP plate where the tensile force is generally high (the loading end) and high gripping force at the end where the tensile force is generally low (the free end).

Figure 2:
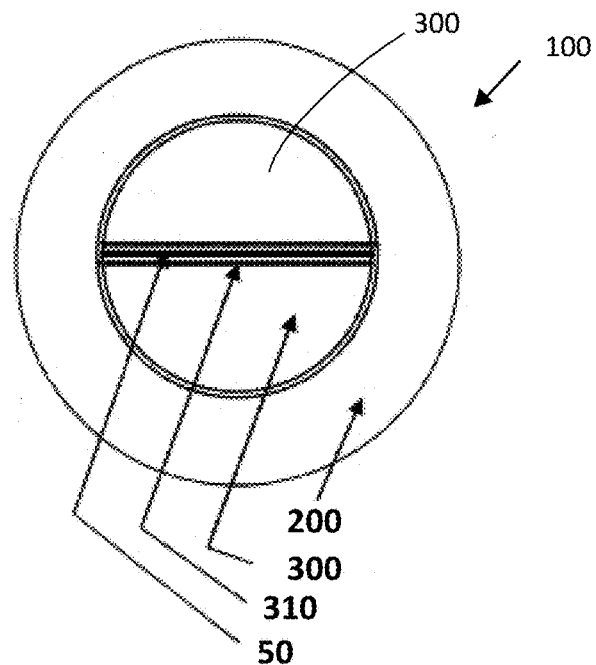
FIG. 2 illustrates a top view of a wedge and outer casing (barrel) of an anchor according to an embodiment.

FIG. 2 is a top view of an embodiment of an anchor system 100. The anchor system includes an outer casing/cylinder (sometimes called a barrel) 200, a wedge 300, in this case, formed in two wedge pieces, and may optionally include a sleeve 310 configured to fit between the wedge 300 and the FRP plate 50.

Figure 3:
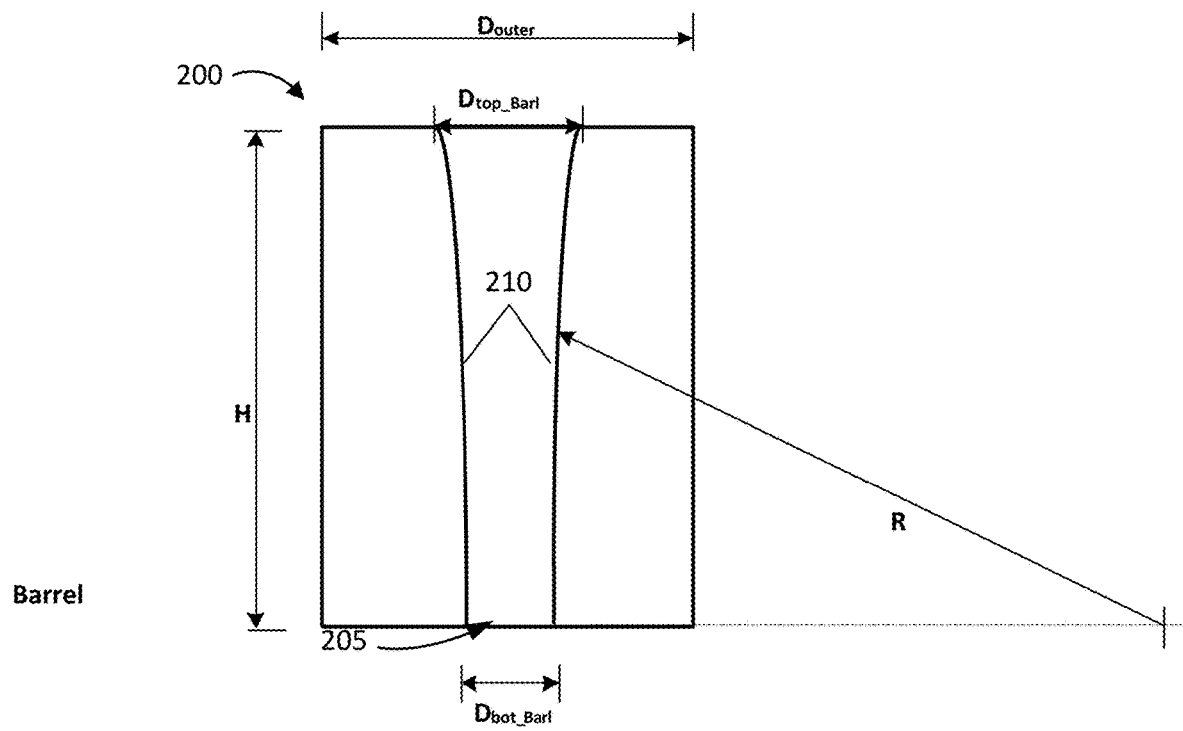
FIG. 3 illustrates a cross-sectional view of an outer casing according to an embodiment.

FIG. 3 illustrates a cross-sectional view of the outer casing 200, in this case, a cylinder. The cylinder 200 is configured to receive the wedge 300 in an opening 205. The inner surface 210 of the cylinder 200 is formed to include an inner profile along the cylinder that is non-linear and based on a radius R as showing in FIG. 3. The location of the centre of the curvature for the radius R is located at the same, or slightly below the level of the end of the cylinder near the loading end of the plate as illustrated. The profile of the inner surface 210 matches to the profile of the outer surface of the wedge 300 when the wedge is located at a specific height ($h_{diff}$) above the base of the outer casing. This is mainly attributed to the difference between the opening diameter of the outer casing ($D_{bot\_Barl}$) and wedge diameter ($D_{bot\_wdg}$). Further it is intended that the length (or height) of the wedge 300 will approximately correspond to the length (or height) of the outer cylinder 200. Different heights of the wedge 300 and cylinder 200 may be used, provided that a structural member having a defined inner gap at the receiving end of the wedge is accommodated as not to hinder the performance of the anchor system.

The outer cylinder 200 may be made of metal, for example, low cost, non-hardened steel, stainless steel, titanium, or the like or may be made of other hard material, for example, ceramic materials, hard plastic materials, or the like. While the outer casing 200 is a cylinder in this embodiment, other shapes may be available, including semi-circular, square, rectangular or the like.

Figure 4:
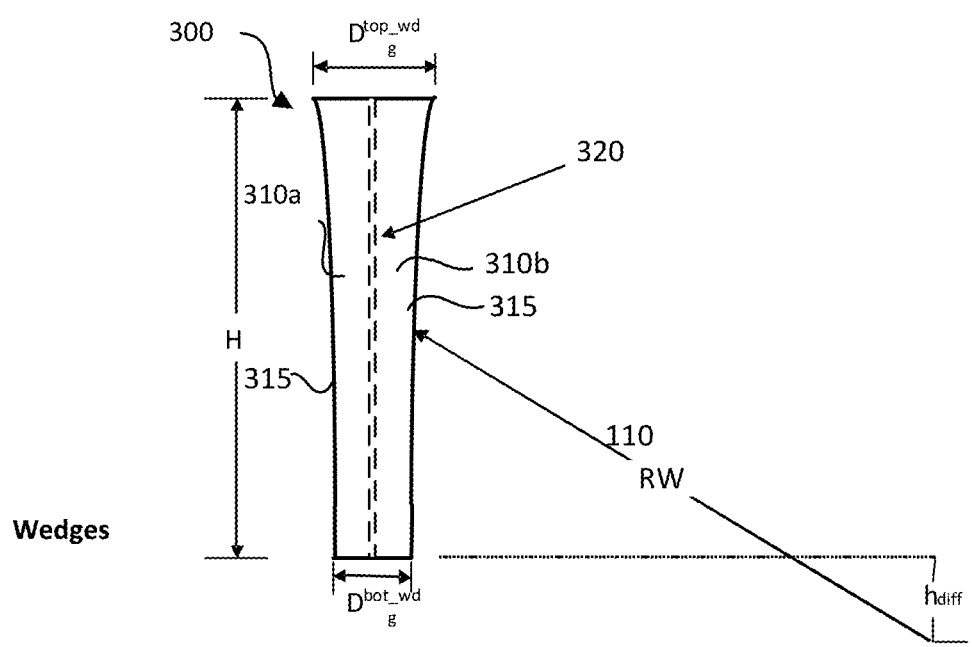
FIG. 4 illustrates a cross sectional view of a wedge according to an embodiment.

FIG. 4 illustrates a cross-sectional view of the wedge 300. As noted, the wedge 300 is configured to be received by the outer casing 200 shown in FIG. 3. In this embodiment, the wedge 300 is comprised of at least two pieces 310a and 310b. Each piece of the wedge 300 may be configured as approximately a semi-circle shape from the top view such that the wedge 300 is similar to a conical frustum with a non-linear profile. The wedge pieces 310a, 310b define an inner gap 320 in which the FRP plate 50 is inserted. The outer surface 315 of each wedge piece 310a, 310b is formed to have a non-linear profile. The degree of the curvature (illustrated by a radius $R_w$ in FIG. 4) is set to be higher at the area of the lowest tensile stress and highest at the point of low tensile stress. As shown in FIG. 4, the centre of radius $R_w$ is set to be at a lower point than the radius R for the casing 200 so that the wedge 300 will enter the casing 200 and be gripped by the casing 200. As one particular example, a radius used in testing was 2000 mm, however a radius selected from within the range of 1000-5000 mm is also expected to be effective depending on the application.

It will be understood that the size of the inner gap 320 may be varied depending on the dimensions/cross-section of the FRP material the anchor system is configured to receive. For example, this inner gap 320 can be as wide and as thick in cross-section as the FRP plate. In a specific example, the anchor may be configured to receive FRP plate between approximately 25 and 175 mm in width, including, for example, FRP plates having widths of 50 mm, 80 mm, 90 mm, 100 mm, 120 mm and 150 mm. The FRP plate may also have various thicknesses depending on the field requirements. As will be understood, a suitable anchor or structure to receive the wedge can be prepared for any of various dimensions of FRP plate. In some cases, as detailed herein, the anchor may be configured to receive FRP material with a cross-section that is circular or having any of various shapes.

In some embodiments, the optional sleeve 310 can be provided between the FRP plate 50 and the wedge 300. The optional sleeve 310 may be, for example, a malleable metal, for example, copper or a copper alloy, aluminum or an aluminum alloy or the like. The optional sleeve is intended to act as "cushion" to, for example, protect the FRP plate from notching or the like.

Figure 5:
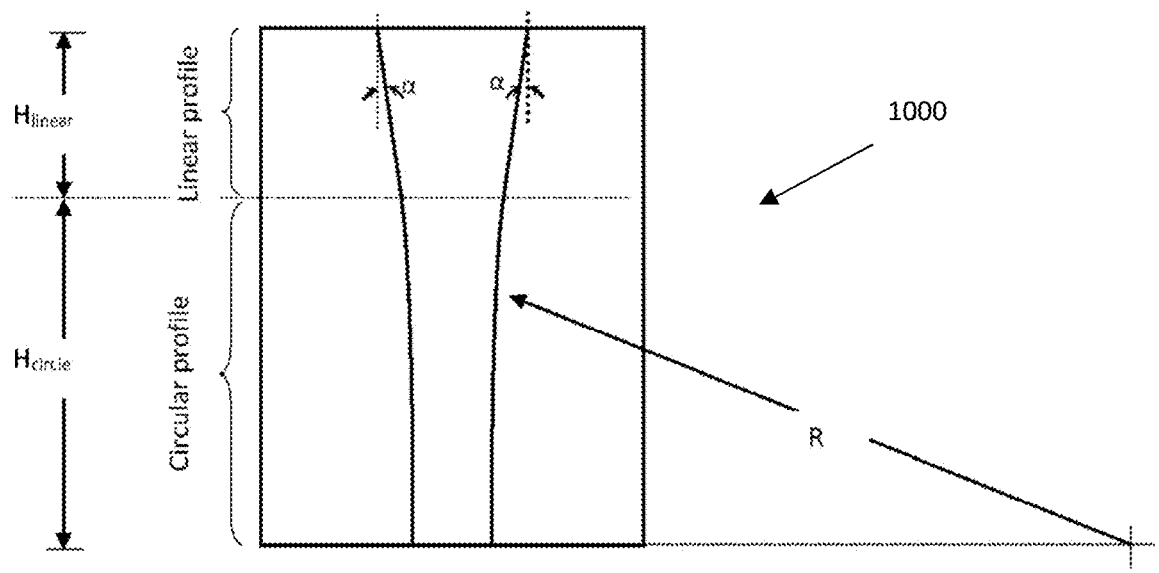
FIG. 5 illustrates a cross-sectional view of another outer casing according to an embodiment.

FIG. 5 illustrates a cross-sectional view of an outer casing 1000, that is similar to the casing 200 (shown in FIG. 2) but is configured to have both a linear profile portion and a non-linear (curved) profile portion. In this case, the inner wall of the casing, has a linear profile portion in which the inner wall slopes at an angle α before joining with the non-linear profile portion, which is similar to the non-linear profile of the casing 200. The point at which the linear profile portion and the non-linear profile portion meet is sometimes referred to as an inflection point. In this case, the linear profile portion is provided at a top of the outer casing 1000 where the tensile stress in the FRP is lower. Generally speaking, although the linear profile portion could be any percentage of the total height, it is preferred to be no more than approximately 60% of the height ($H_{linear}<=60\%$ H).

Figure 6:
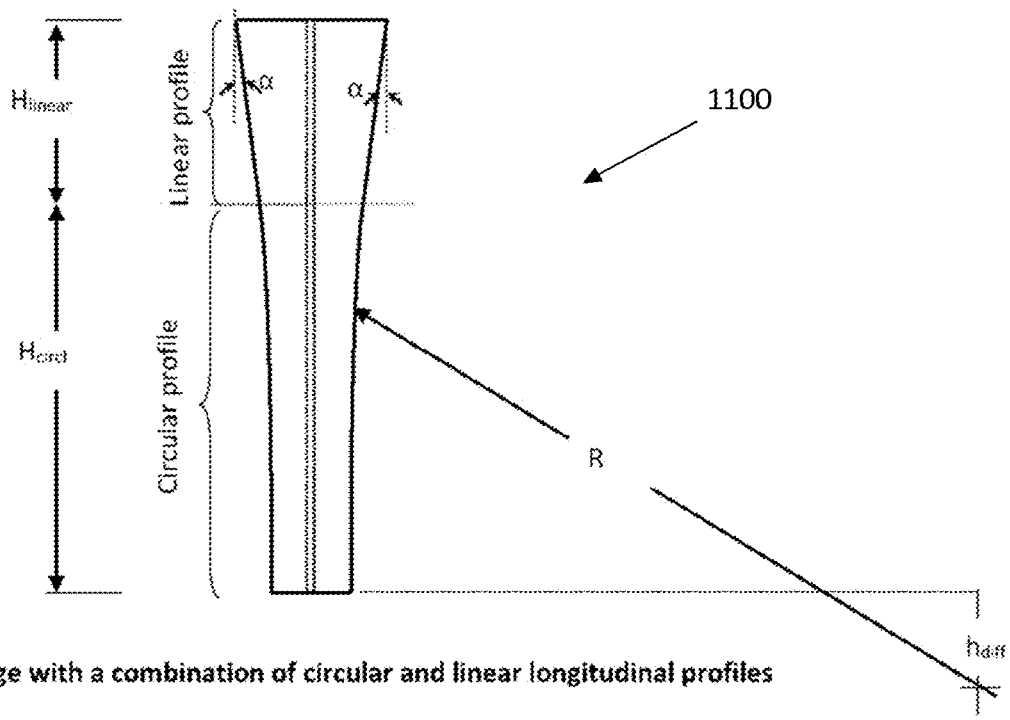
FIG. 6 illustrates a cross sectional view of another wedge according to an embodiment.

FIG. 6 shows a cross-section of a wedge 1100 intended to mate with the outer casing 1000. Here, the wedge 1100 is similar to the wedge 300 (shown in FIG. 2). As illustrated, the wedge 1100 also has a linear profile portion and a non-linear (circular) profile portion to generally match with those of the casing 1000. The use of a linear profile portion in this way is intended to avoid a larger difference between the top outer casing opening diameter and the top wedge diameter as the length of the anchor increases and radius of curvature decreases. This structure is intended to facilitate the movement of the wedge 1100 inside the outer casing 1000. Further, the provision of the linear profile portion and the inflection point is intended to allow for full use of the outer barrel (outer casing) instead of having a part of the barrel or an inner ledge stick out. As such, it is expected that this linear profile portion will allow approximately 20% shorter anchor length. Still further, the linear profile portion is expected to reduce the outer most stress so the outer casing (outer barrel) can be thinner. Overall, this arrangement of linear profile portion, inflection point and non-linear profile portion is intended to provide weight savings and space savings without reducing the strength of the anchor system.

Figure 7:
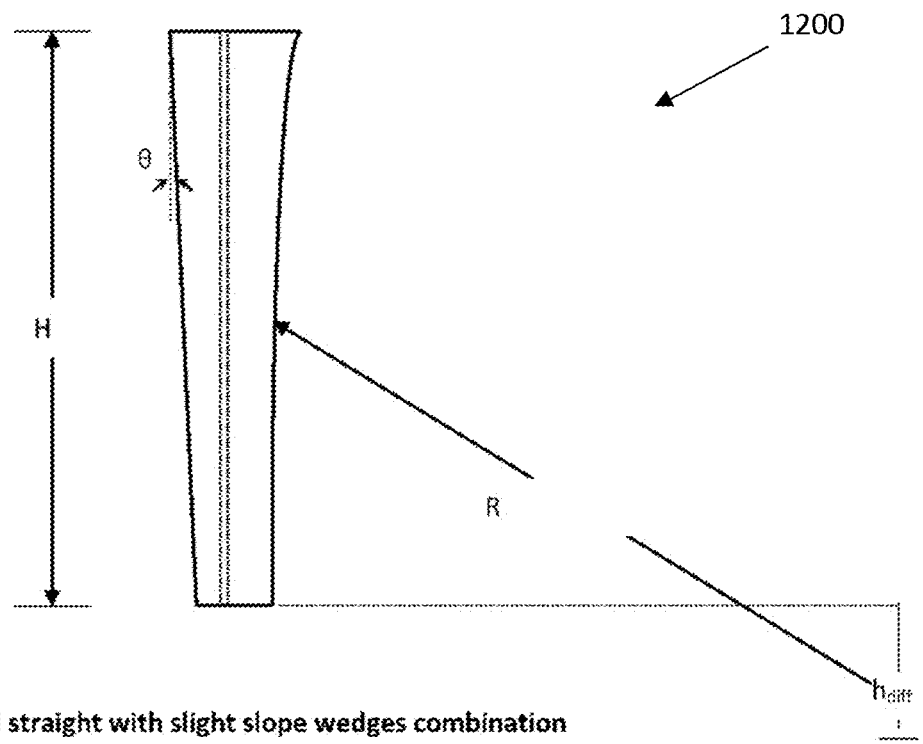
FIG. 7 illustrates a cross sectional view of yet another wedge according to an embodiment.
Figure 8:
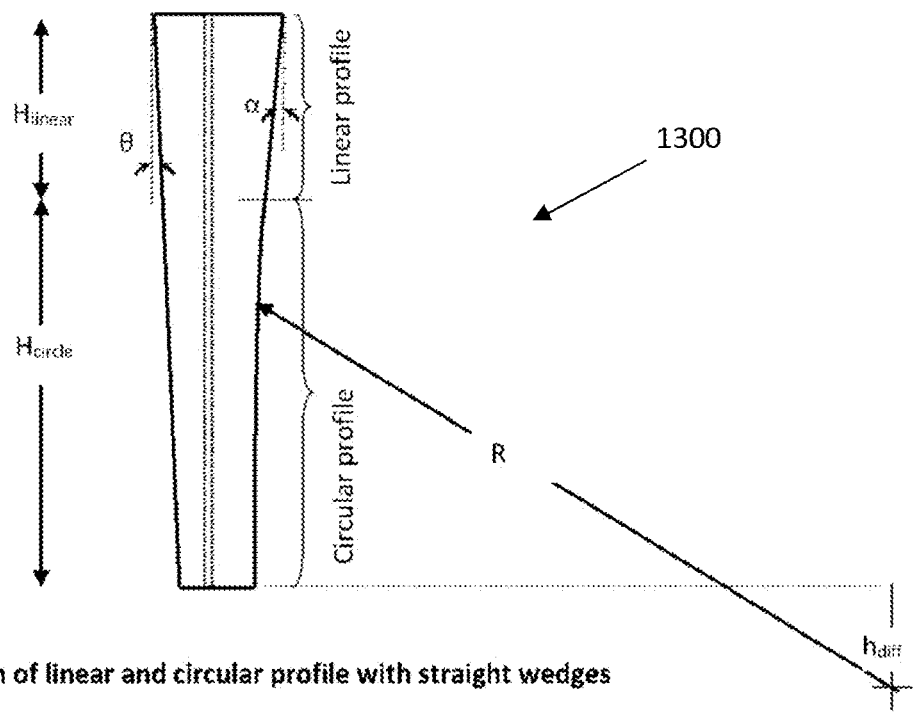
FIG. 8 illustrates a cross sectional view of yet another wedge according to an embodiment.

It will be understood that other arrangements of wedges and corresponding outer casings may also be possible. For example, FIGS. 7-10 illustrate alternate wedge structures and the corresponding outer casing structures to these wedges will be understood based on the foregoing description and may be, for example, similar to the outer casing 200 of FIG. 2. FIG. 7 shows a wedge 1200 including a wedge piece having a non-linear profile similar to that described above combined with a wedge piece having a linear profile arranged at an angle θ with respect to the height of the wedge piece. FIG. 8 illustrates a wedge 1300 including a wedge piece having both a linear profile section and a non-linear profile section similar to that described above combined with a wedge piece having a linear profile similar to that of the wedge piece in FIG. 7.

Figure 9:
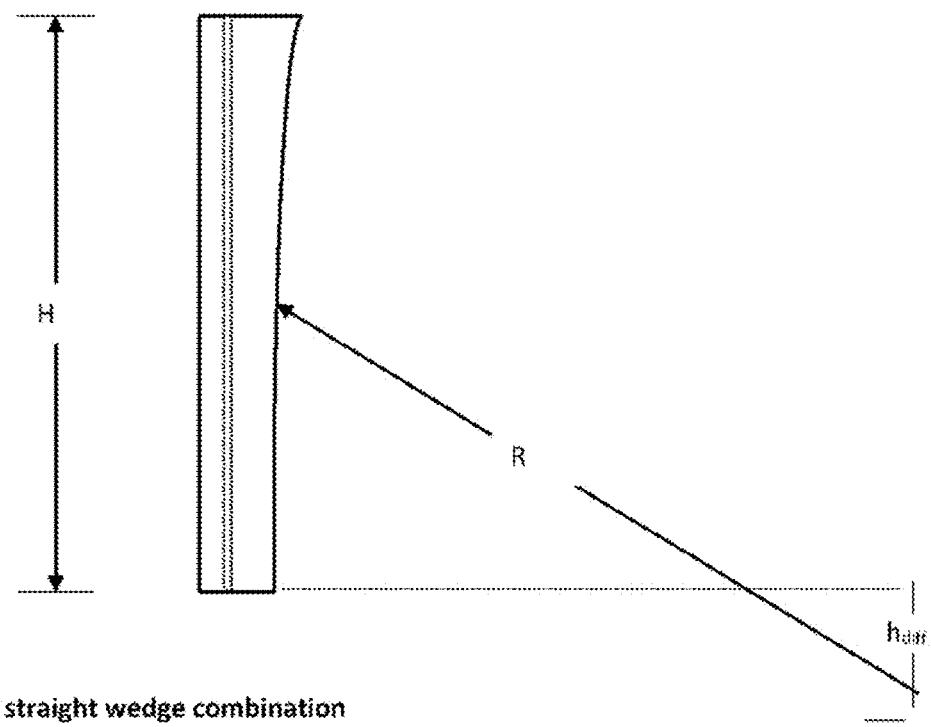
FIG. 9 illustrates a cross sectional view of still yet another wedge according to an embodiment.
Figure 10:
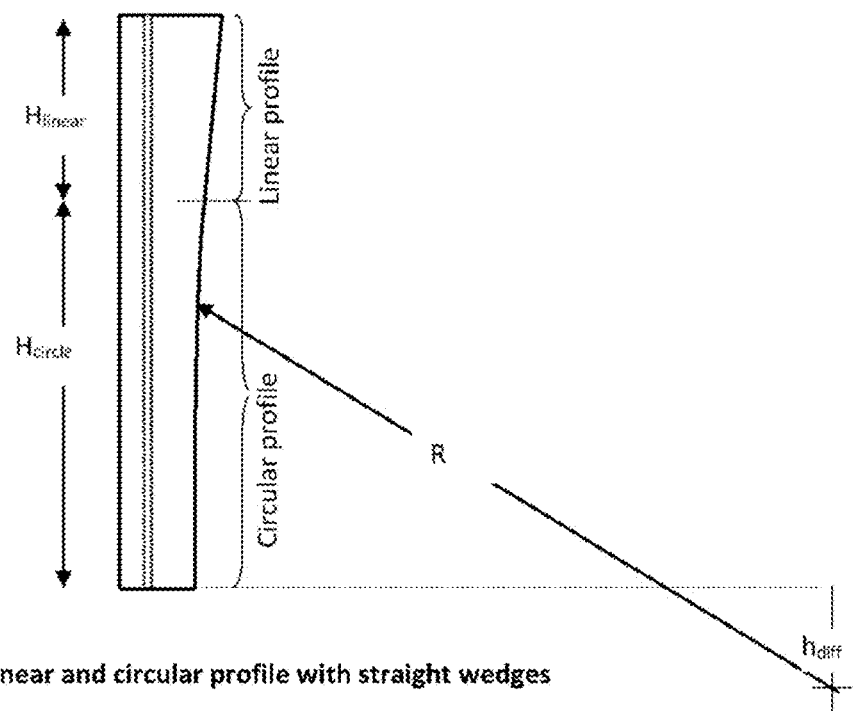
FIG. 10 illustrates a cross sectional view of a further wedge according to an embodiment.

In FIGS. 9 and 10, the wedge piece having a linear profile is replaced with a wedge piece having a straight (i.e. non-angled) profile along the height thereof. In these cases, the wedge function is performed by the wedge piece having the non-linear profile (FIG. 9) or both the linear profile section and non-linear profile section (FIG. 10).

Figure 11:
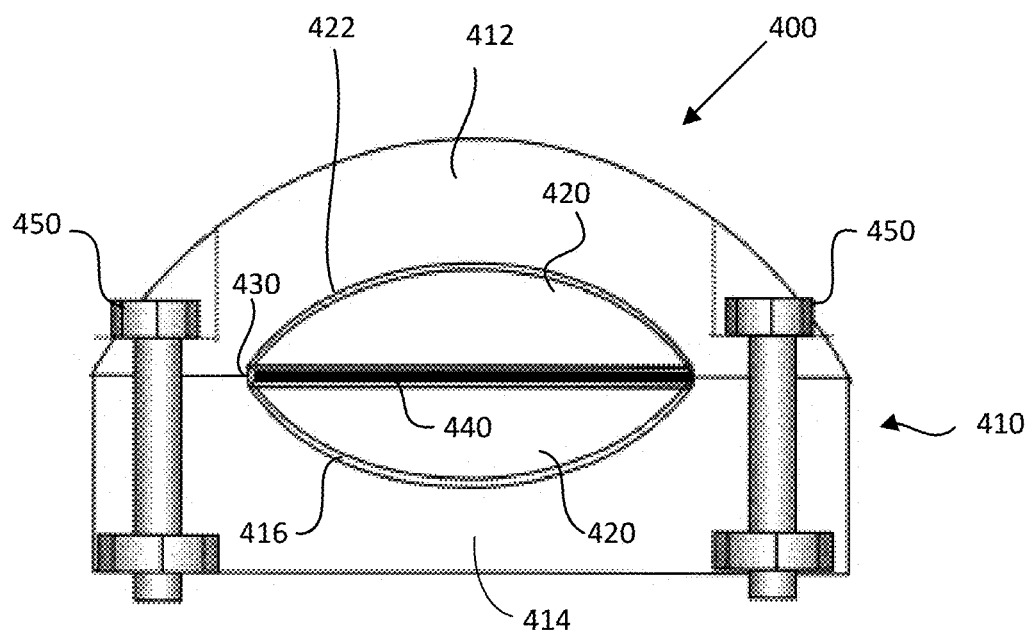
FIG. 11 illustrates an alternative embodiment of an anchor system using bolts.

FIG. 11 illustrates a top view of an alternative embodiment of an anchor system 400. In this embodiment, the anchor system 400 includes a two part casing 410 having a first side 412 and a second side 414 and two symmetric wedges 420, wherein each wedge has a profile that is a segment of a circle, that is, a cut-off portion bounded by an arc and chord of a circle. Other symmetric shapes are possible, including, for example, rectangular shapes, two semi-circular shapes or the like. An outer edge surface 422 of each wedge 420 is formed to have a profile as described above. The outer casing 410 is formed in a shape to receive the symmetric wedges 420. An inner edge surface 416 of the outer casing 410 includes a non-linear profile that corresponds to the non-linear profile of the wedges 420. It is intended that the outer casing 410 be made of steel, stainless steel or other hard metallic or non-metallic substance. A benefit of using less than a full semi-circle for the wedge shape is that less material is needed and the anchor will have less weight and size.

The two symmetric wedges 420 are configured to support an FRP plate 440, for example, a CFRP plate or the like, between them when inserted into the casing 410. In some cases, the anchor system 400 may include fasteners 450, for example a bolt and nut system (this may include various arrangements, for example, in some cases, the "nut" may be a thread cut into the casing), a male and female connector, a welded fastener, or the like. High strength bolts and nuts are preferred. As noted above, in some cases, an optional sleeve 430, made of a malleable metal, for example copper, aluminum, or the like may be inserted between the wedges.

Figure 12:
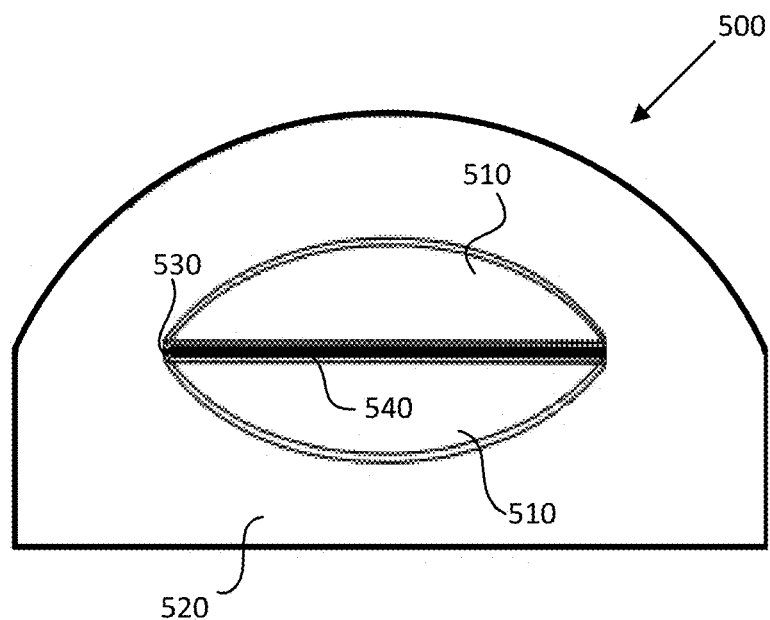
FIG. 12 illustrates an alternative embodiment of an anchor system without the use of bolts.

FIG. 12 illustrates an anchor system 500 similar to the anchor system shown in FIG. 11. The anchor system 500 includes two symmetric wedges 510, wherein the wedges may be circular segments, rectangular segments, or a combination thereof. The outer edge profile of each wedge 510 has a profile as described above. The wedge 510 may be received by a casing 520 which includes a complimentary corresponding profile on an inner edge of the casing 520. In this case, the casing 520 may be formed by casting or perhaps detailed machining in order to avoid the need for fasteners as in the embodiment shown in FIG. 11. As above, the two symmetric wedges 510 are intended to form a gap when received by the casing 520. The gap may be configured to receive a sleeve 530 of malleable material and configured to receive FRP material 540, for example a CFRP plate, or the like.

Figure 13:
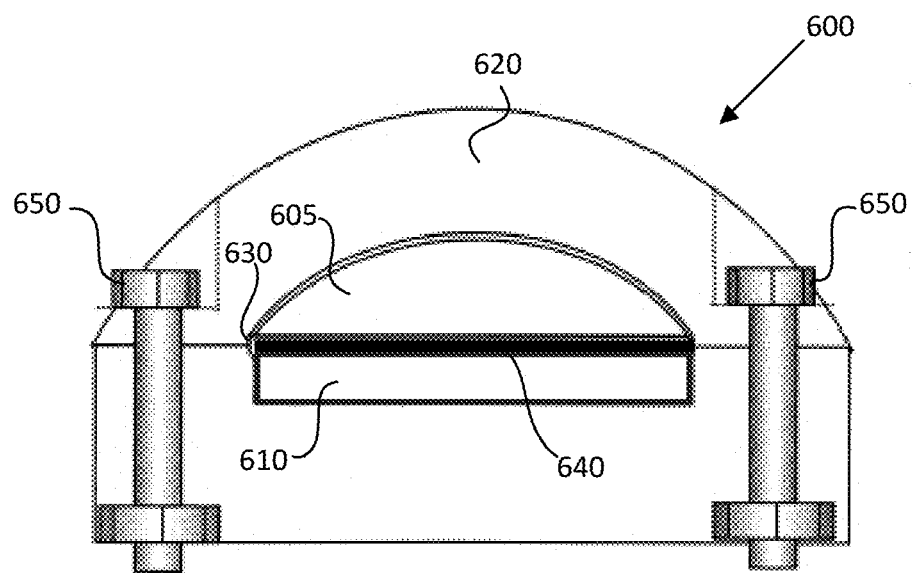
FIG. 13 illustrates another alternative embodiment of an anchor system using bolts.

FIG. 13 illustrates another embodiment of an anchor system 600. In this embodiment a circular segment wedge 605 is combined with a rectangular wedge 610. The rectangular wedge may include a flat profile on the outer edge or may include a shallow angle along the outer edge as described above with regard to FIGS. 7 and 9. In some cases, the shallow angle may be less than 1°. Including an angle may allow for slight additional pressure in the anchor system 600. An outer casing 620 is configured to receive the pair of circular segment wedge 605 and rectangular wedge 610. When paired, the circular segment wedge 605 and rectangular wedge 610 are configured to include an inner gap which may receive an optional sleeve 630 of malleable material. The sleeve 630 or the inner gap then receives the FRP material 640. The outer casing 620 may be in two pieces and held together via bolts 650.

A benefit of using a circle segment and rectangular piece for the wedge shape is that less material is needed and the anchor will have less weight and size. There may also be benefits in the machining process such as, for example, it may be possible to produce two sets of wedges from a single cylinder of material rather than a single wedge (if semi-circular).

Figure 14:
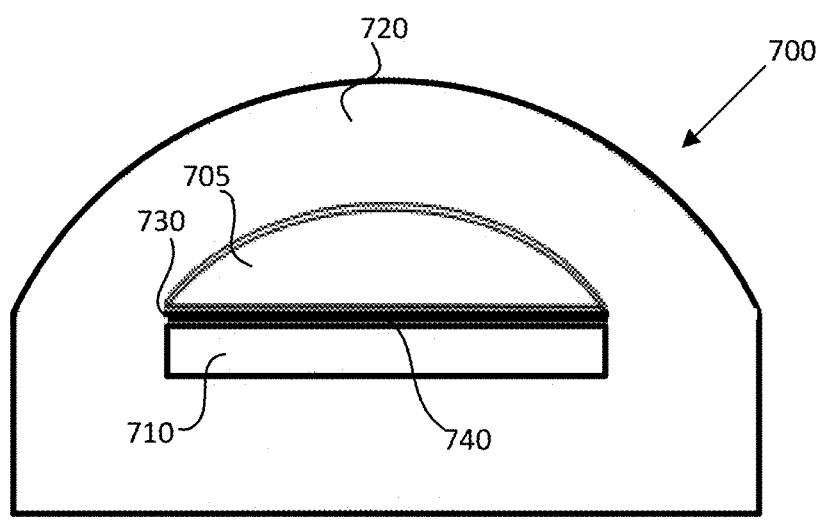
FIG. 14 illustrates yet another alternative embodiment of an anchor system without the use of bolts.

FIG. 14 illustrates another embodiment of an anchor system 700. In this embodiment a circular segment wedge 705 is included with a rectangular wedge 710. The rectangular wedge may include a flat profile on the outer edge or may include a shallow angle along the outer edge. In some cases, the shallow angle may be less than 1°. Including an angle may allow for slight additional pressure in the anchor system 700. An outer casing 720 may also be configured to receive the circular segment wedge 705 or the pair of circular segment wedge 705 and rectangular wedge 710. The outer casing 720 may be fabricated of metal, for example steel, or other hard material via machining or, in some cases by making two pieces and bonding the pieces together, for example, through welding, adhesion or the like, provided that the bonding has sufficient strength to support the stresses placed on the anchor system. When paired, the circular segment wedge 705 and rectangular wedge 710 are configured to include an inner gap which receives the FRP material 740. Optionally, a sleeve 730 of malleable material may be included between the outer casing 720 and the FRP material.

Figure 15:
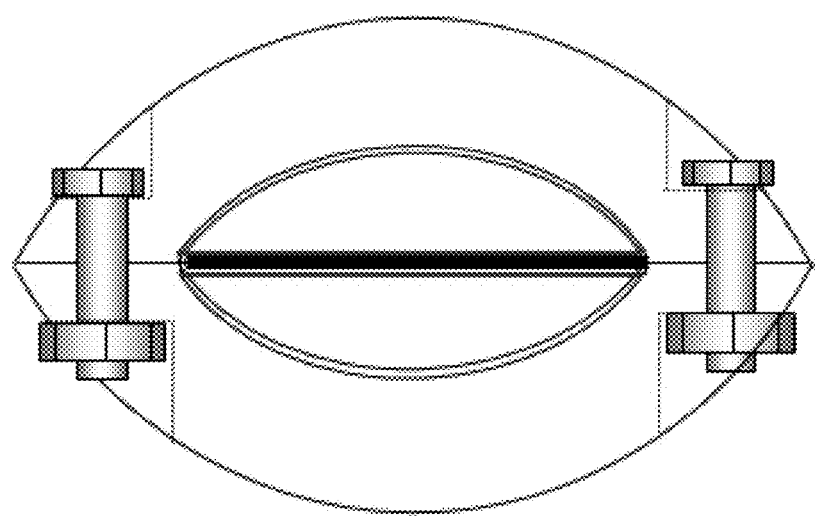
FIG. 15 illustrates yet another alternative embodiment of an anchor system.

FIG. 15 illustrates yet another embodiment of an anchor system. In this embodiment two circular segment wedges are provided and an outer casing is configured to receive the pair of circular segment wedge pieces. The outer casing has a similar shape as the wedge pieces and is formed in two pieces held together by a fastening system.

Figure 16:
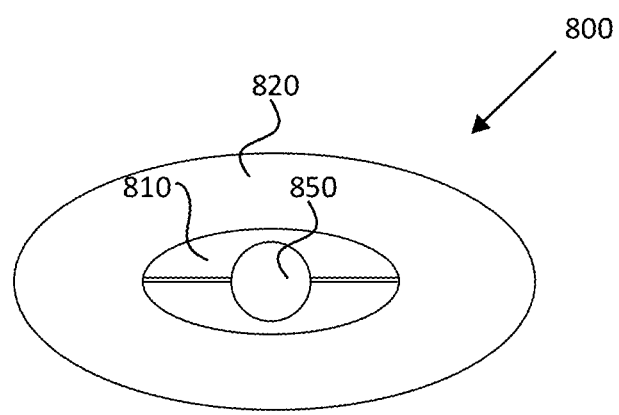
FIG. 16 illustrates yet another alternative embodiment of an anchor system to be used with a material having a circular cross-section

FIG. 16 is a top view of another embodiment of an anchor system 800. The anchor system includes an outer casing/cylinder (sometimes called a barrel) 820, a wedge 810, in this case, formed in two wedge pieces. The wedge 810 forms a circular opening 850. FIG. 16 illustrates an embodiment intended to be used with a FRP material having a generally circular cross-section.

Various embodiments of wedges have been illustrated herein. It will be understood that the actual shape of the embodiments of the wedges may be altered so long as the profile between the wedge and the outer casing is maintained. Circular or rectangular wedge pieces have been illustrated as generally being easier to form. Further, the embodiments of the wedges described herein are intended to be adaptable for use with various sizes of reinforcing members and may be used with any suitable casing, anchor or support structure (for example, a support structure provided as a part of a beam, other structural member, or the like) that is provided with an appropriate internal profile for accepting the selected wedge.

In the above description, similar parts have not always been renumbered or described in detail as other descriptions of those parts will apply to the various embodiments disclosed. Further, elements from each of the embodiments may be used with other embodiments as will be understood by one of skill in the art. For example, different types of outer casings may be used with different types of wedges as long as the related matching profiles are arranged appropriately.

It is intended that the embodiments of the anchor system detailed herein will provide a high load carrying capacity which is intended to allow for the full strength or a significant portion of the strength of the FRP plate to be engaged. The embodiments of the anchor system are intended to be easy to use and compact. Many of the components are intended to be reusable, although the malleable sleeve may become deformed in use and there may be situations where it is not reused and can be a replaceable part.

The embodiments of the improved FRP plate anchor herein are intended to contribute to the repair, rehabilitation and retrofitting of infrastructure by providing compact, lightweight means for prestressing the FRP plate reinforcement on corroded bridges, buildings, tunnels, seaports and other structures. Furthermore, the FRP plate reinforcement anchors may also be used for new construction of buildings and the like may; and also enable a wider use of different FRP materials in other industries (for example, automotive, aviation, space, ship-building industries, and the like).

In some cases, non-corrosive materials such as stainless steel may be used to prevent corrosion of the anchor system.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding.

The above-described embodiments are intended to be examples only. Alterations, modifications and variations can be effected to the particular embodiments by those of skill in the art without departing from the scope, which is defined solely by the claims appended hereto.

What is claimed is:

1. An anchor system for fiber reinforced polymer (FRP) material comprising:
    an outer casing comprising:
        a linear inner profile portion; and
        a circular inner profile portion, both on an inner surface of the outer casing;
    a wedge configured to be housed by the outer casing, the wedge comprising:
        a linear outer profile portion configured to mate with the linear inner profile portion of the outer casing;
        a circular outer profile portion configured to mate with the circular inner portion of the outer casing, both on the outer surface of the wedge; and
        an inner gap formed in the wedge and configured to receive the FRP material,
    wherein the wedge does not extend beyond the outer casing;
    wherein the wedge comprises at least two pieces.

2. An anchor system according to claim 1 further comprising a sleeve provided between the wedge and the FRP in the inner gap.

3. An anchor system according to claim 2 wherein the sleeve is comprised from a malleable metal.

4. An anchor system according to claim 1 wherein the wedge comprises two symmetric pieces.

5. An anchor system according to claim 1 wherein the linear profile portion of the outer casing is no more than approximately 60% of the height of the outer casing.

6. An anchor system according to claim 1 wherein the outer casing comprises two pieces.

7. An anchor system according to claim 6 further comprising fasteners configured to fasten the two pieces of the outer casing.

8. An anchor system according to claim 6 wherein the two pieces of the outer casing are symmetric.

9. An anchor system according to claim 6 wherein the two pieces of the outer casing are asymmetric.

10. An anchor system according to claim 1 wherein the wedge comprises two pieces, a first piece comprising:
    the linear outer profile portion; and
    the circular outer profile portion; and
a second piece comprising a linear profile arranged at a predetermined angle with respect to the height of the wedge.

11. An anchor system according to claim 1 wherein the wedge comprises two pieces, a first piece comprising:
    the linear outer profile portion; and
    the circular outer profile portion; and
a second piece comprising a linear profile along the height of the wedge.

12. An anchor system according to claim 1 wherein the inner gap has a rectangular cross-section.

13. An anchor system according to claim 1 wherein the inner gap has a multi-faceted cross-section.

14. An anchor system according to claim 1 wherein the inner gap has a rounded cross-section.

15. A wedge for an anchor system, the wedge comprising:
    an outer surface to engage with a support structure, wherein the outer surface comprises:
        a linear outer profile portion configured to mate with a linear inner profile portion of the support structure; and
        a circular outer profile portion configured to mate with a circular inner portion of the support structure; and
    an inner gap formed in the wedge and configured to receive a FRP material,
    wherein the wedge is configured to not extend beyond the support structure; and
    wherein the wedge includes at least two pieces.

16. A wedge according to claim 15 wherein the inner gap has a rectangular cross-section.

17. A wedge according to claim 15 wherein the inner gap has a multi-faceted cross-section.

18. A wedge according to claim 15 wherein the inner gap has a rounded cross-section.

19. A method for anchoring fiber reinforced polymer (FRP) material, the method comprising:
    placing a wedge in an outer casing such that an outer surface of the wedge abuts an inner surface of the outer casing via linear and circular outer profile portions of the wedge configured to mate linear and circular inner profile portions of the outer casing and such that the wedge does not extend beyond the outer casing, wherein the wedge includes at least two pieces; and compressing an end of the FRP material in the wedge such that the pressure profile of the wedge has a linear portion at the tensioned end of the FRP material and a circular portion adjacent to the linear portion.

20. A method for anchoring according to claim 19 wherein the linear and circular outer profile portion of the wedge is configured to distribute gripping stress across the wedge and outer casing.

\* \* \* \* \*